(No Model.)

A. E. WITHERELL & D. B. CLEMENT.
BUNG VALVE FOR BARRELS.

No. 288,390. Patented Nov. 13, 1883.

Witnesses:
Walter E. Lombard
E. A. Hemmenway

Inventors,
Alonzo E. Witherell,
Daniel B. Clement,
by N. C. Lombard
Attorney.

United States Patent Office.

ALONZO E. WITHERELL, OF MEDFORD, AND DANIEL B. CLEMENT, OF BOSTON, MASSACHUSETTS.

BUNG-VALVE FOR BARRELS.

SPECIFICATION forming part of Letters Patent No. 288,390, dated November 13, 1883.

Application filed April 4, 1883. (No model.)

*To all whom it may concern:*

Be it known that we, ALONZO E. WITHERELL, of Medford, in the county of Middlesex, in the State of Massachusetts, and DANIEL B. CLEMENT, of Boston, in the county of Suffolk and State of Massachusetts, have invented certain new and useful Improvements in Bung-Valves for Barrels, of which the following, taken in connection with the accompanying drawings, is a specification.

Our invention relates to a combined bung and valve for use in beer and other barrels; and it consists in the combination, with a bung having a central discharge-orifice, of a valve arranged to close the inner end of said orifice and to open inward, a threaded valve-stem, and a socketed nut set in said bung and adapted to be revolved therein and force said valve inward or outward, as will be more fully described.

It further consists in a novel arrangement of the valve and valve-stem relative to the discharge-orifice, whereby the valve is adapted to close the discharge-orifice and the opening in which is mounted the valve-stem, as will be described.

Figure 3:
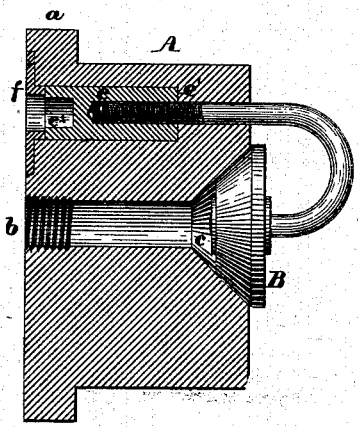
Figure 2:
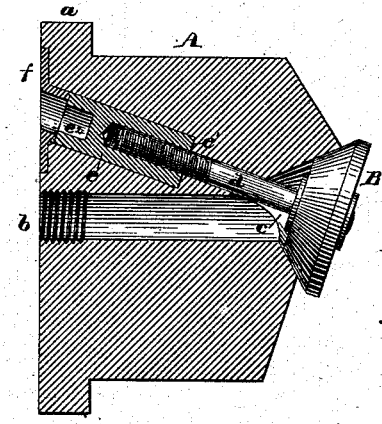
Figure 1:
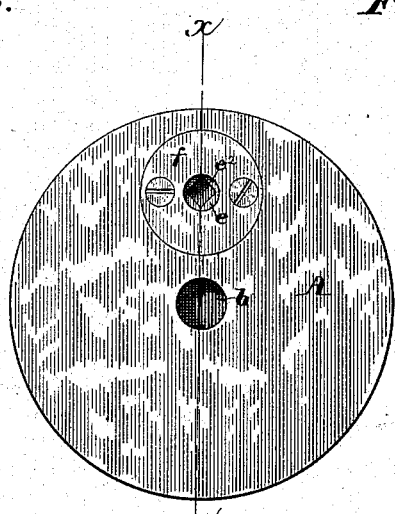

Figure 1 of the drawings is a front elevation of our improved bung and valve. Fig. 2 is a section on line $x\ x$ on Fig. 1; and Fig. 3 is a similar section, illustrating a modification in the position of the valve and valve-stem.

A is the bung, provided with the flange $a$, to bear against the outer surface of the barrel-head, and with the central discharge-orifice, $b$.

A conical valve-seat, $c$, is formed in the inner end of the bung A, upon which is seated the valve B, attached to the inner end of the valve-stem $d$, the outer end of which has formed thereon a male screw-thread, to fit a corresponding female thread in the cylindrical nut $e$, fitted to be revolved in a bearing in the bung, between the shoulder $e'$ and the inner end of the flanged annular plate or ring $f$, firmly secured by screws to the front end of the bung, as shown.

The outer end of the nut $e$ has formed therein a key-socket, $e^2$, for the reception of a suitable instrument, by means of which it may be revolved in either direction, according as to whether it is desired to open or close the valve.

The inner end of the bung may be parallel with its outer end, and the valve-stem be bent, as shown in Fig. 3; or the inner end of the bung may be inclined or oblique to its outer end, and a straight valve-stem arranged at an angle to the discharge-orifice may be used, as shown in Fig. 2; but we prefer the latter form, for the reason that the valve effectually closes both the discharge-orifice and the opening in which the valve-stem and nut have their bearings, and thus obviates the necessity for a stuffing-box or packing around the valve-stem. This makes a very convenient and effective device for drawing beer and other liquids from barrels, and which may be applied to the barrels when they are made, and remain therein till the barrels are worn out without danger of the valve being opened in handling the barrels.

The outer end of the discharge-orifice is provided with a screw-thread, to receive a discharge-pipe or faucet.

What we claim as new, and desire to secure by Letters Patent of the United States, is—

1. The combination of a bung having a central discharge-orifice, a valve arranged to close the inner end of said orifice and to open inward, a threaded valve-stem, and a nut inclosed in said bung and adapted to be revolved to force said valve inward or outward, substantially as and for the purposes described.

2. In combination with a bung having a discharge-orifice through the same, a valve, a valve-seat, and a threaded valve-stem, all arranged obliquely to said discharge-orifice, and a nut inclosed in said bung and adapted to be revolved to open or close said valve, substantially as described.

In testimony whereof we have signed our names to this specification, in the presence of two subscribing witnesses, on this 2d day of April, A. D. 1883.

ALONZO E. WITHERELL.
DANIEL B. CLEMENT.

Witnesses:
C. H. DODD,
W. E. LOMBARD.